United States Patent Office 3,512,585
Patented May 19, 1970

3,512,585
METHOD OF RECOVERING HYDROCARBONS BY IN SITU VAPORIZATION OF CONNATE WATER
Joseph C. Allen, Bellaire, Tex., assignor to Texaco Inc., New York, N.Y., a corporation of Delaware
No Drawing. Filed Aug. 8, 1968, Ser. No. 753,840
Int. Cl. E21b 43/24
U.S. Cl. 166—245         7 Claims

ABSTRACT OF THE DISCLOSURE

A method of recovering hydrocarbon materials from a subterranean hydrocarbon-bearing formation wherein the in situ vaporization of the connate water contained in the formation provides a mechanism for displacing the hydrocarbons contained therein. A heated non-aqueous fluid is introduced via an injection well into the formation at a temperature sufficient to cause vaporization of the water in the formation thereby causing a volumetric expansion which permits recovery of the hydrocarbons via an adjacent production well. A heated non-aqueous fluid may then be injected into the production well to vaporize the water in the formation and permit recovery of hydrocarbons via the original injection well.

BACKGROUND OF THE INVENTION

This invention relates generally to an improved method of recovering hydrocarbons from a subterranean hydrocarbon-bearing formation. More particularly, this invention relates to a secondary recovery process wherein vaporization of the water contained in the formation displaces the hydrocarbons contained therein toward a recovery well.

In modern day production of hydrocarbons from subterranean formations, it has become common practice to apply secondary recovery techniques to recover additional quantities of hydrocarbons from the formation. Among the more common methods currently employed in secondary operations are those involving water, steam or gas flooding, in situ combustion, and combinations thereof. Basically, each of these methods is directed at displacing hydrocarbons contained in the formation toward a production well and permitting recovery therethrough.

After completion of either a primary or secondary recovery process, capillary forces result in the retention of a considerable amount of hydrocarbons and connate water in the small recesses of the formation. Generally, the porous portions of the formation contain large volumes of hydrocarbons occupying minute interstices, which are difficult to recover. It is virtually impossible to recover these hydrocarbons by means of dynamic displacement with fluids injected into the formation. However, small amounts of connate water are found distributed more or less generally throughout the hydrocarbons remaining in the formation. Generally, the smaller pores contain a higher volume percentage of water saturation than found in the larger pores. The invention herein disclosed provides a novel secondary recovery process wherein vaporization of the residual connate water displaces hydrocarbons contained in the formation and permits recovery thereof.

SUMMARY OF THE INVENTION

The invention herein disclosed provides an improved method of recovering hydrocarbons from a subterranean hydrocarbon-bearing formation. A non-aqueous pressurized fluid, at a temperature sufficient to cause vaporization of the connate water contained in the formation, is injected into the formation via an injection well. The hydrocarbons contained in the formation are displaced by means of the substantial volumetric expansion of the formation water caused by vaporization, thereby allowing recovery of the hydrocarbons via an adjacent production well.

The principal advantage made possible by the method of this invention over prior art methods is that an effective and efficient method is provided by which substantially all of the hydrocarbons contained in a formation may be recovered. It is known in the prior art, that when an in-situ combustion process is utilized, the temperature generated is sufficiently high to cause vaporizatoin of the connate water contained in the formation. However, this process has found limited application since the crudes contained in the formation do not always favorably propagate the reaction. Furthermore, in situ combustion consumes a substantial quantity of the in-place crude. By the method of this invention, connate water contained in the formation is readily vaporized and provides a means for displacing the crudes remaining in the formation without any consumption thereof as is the case with in situ combustion. Further, the method of this invention permits other beneficial fluids, e.g., a fluid miscible with the hydrocarbons, to be injected into the formation in combination with the fluid provided to transfer heat thereto.

Accordingly, it is a primary object of this invention to provide an effective and efficient method for increasing the recovery of hydrocarbons from subterranean formations.

A further object of this invention is to provide an improved method for displacing hydrocarbons contained in the formation by means of injecting a heated fluid therein.

These and other objects, advantages and features of the invention will become more apparent from the following description of one embodiment of the invention.

DESCRIPTION OF THE PREFERRED EMBODIMENT

The objects of the invention are accomplished by employing a method wherein a non-aqueous fluid is injected into the formation in a quantity sufficient to raise the temperature of the formation fluids above the vaporization temperature of water at the prevailing pressure in the formation. The volumetric expansion, caused by the vaporization of the connate water in the formation, provides a mechanism for displacing the hydrocarbons contained in the formation toward an adjacent production well.

The method disclosed herein is a further development of the disclosure contained in my copending, co-assigned application for patent entitled Well Stimulation, Ser. No. 753,839, filed Aug. 8, 1968.

Heating the formation to an elevated temperature causes rapid vaporization of the connate water contained therein. This large volumetric expansion of the water causes a substantial pressure build-up in the formation and is in effect in situ steam generation. The injection of a non-aqueous heated fluid into the formation provides a two-fold benefit, viz., the viscosity of the oils contained in the formation are substantially reduced because of heating, and the volumetric expansion of the in-place water provides a means for displacing the hydrocarbons contained therein. Further, in situ flashing of the connate water displaces residual hydrocarbons from the remote or otherwise inaccessible interstices in the formation.

Any type of non-aqueous heated fluid at a temperature sufficient to heat the formation to a temperature above that of saturated steam under the pressure existing in the formation will suffice to accomplish the method of this invention. Examples of gases which may be utilized as the fluid required by this method are carbon monoxide, carbon dioxide, methane, ethane, oxygen, air, nitrogen and liquefied petroleum gas. A preferred liquid is one which has a vapor pressure below the vapor pressure of water and is also miscible with the hydrocarbons contained in the formation. A further desirable feature is to use a fluid which is readily recoverable and displaceable by another less expensive fluid. Examples of the preferred classes of liquids which may be utilized as the fluid are hydrocarbons having from five to eight carbon atoms, toluene, naphtha and aromatics.

The following by way of example is explanatory of the method of this invention. Heptane, at about 450 p.s.i. and 500° F., is injected into a formation where the in-place liquids consist of 70% hydrocarbons and 30% connate water, thereby raising the initial formation temperature from 150° F. to approximately 460° F. This temperature increase causes vaporization of the connate water and effects a volumetric expansion to approximately 60 times the original volume occupied. This large expansion provides an expulsive force for driving substantially all of the hydrocarbons contained in the formation toward an adjacent production well. Thereafter, the remaining fluids in the formation comprise a liquid mixture of heptane, some remaining hydrocarbons and an immiscible steam phase. The steam, previously generated by the in situ vaporization of the connate water, is produced along with the hydrocarbons, leaving the formation with substantially pure heptane in the liquid phase. A subsequent injection of methane is then used for displacing the previously injected heptane. Upon the concentration of the heptane in the formation being reduced to approximately 70%, the liquid heptane vaporizes and a subsequent injection of gas results in a highly efficient displacement of the methane-heptane mixture since the driving mechanism is a gas-gas displacement. This results in a final displacement of the injected fluid by means of a more economical gaseous fluid and permits recovery thereof via the production well.

A further example of the utility of the disclosure contained herein is directed at injecting a heated hydrocarbon into a formation wherein the productivity has declined. With the injection and production wells traversing the formation arranged in a five-spot pattern, a heated hydrocarbon is injected via an injection well into the formation. Prior to injection thereof, the hydrocarbon liquid, having a narrow boiling range with an average boiling point or a 50% boiling point at about 220 to 350° F. at atmospheric pressure, is passed through a steam generator operating at discharge conditions between 400 and 500 p.s.i., temperatures between 450 and 550° F., and with 80% of the efflux as a vapor. Injection is mtaintained until all of the connate water in the formation has been flashed to vapor. The vapor generated in situ is produced to the surface via the production wells and is continued until water and/or steam production ceases. Injection of the heated hydrocarbon fluid is terminated thereupon, and a natural gas is injected by means of the same injection well, thereby driving the remaining hydrocarbon liquids, both those originally contained in the formation and those injected thereinto, toward the production wells. Injection is then terminated and some of the natural gas existing in the formation under pressure is produced to the surface by pressure depletion.

Alternatively, the heated hydrocarbon may be injected into the formation via the injection well until the connate water for about one-half the distance between the injection and production wells is vaporized to steam. During this period, hydrocarbons may be recovered via the production wells. The pattern is then reversed by converting the former production wells to injection wells and the heated hydrocarbon is injected therein until the remaining connate water contained in the formation has been vaporized to steam. The in situ steam generation provides a displacement mechanism permitting recovery of hydrocarbons via the original injection well. Injection of a driving fluid, such as methane, is then commenced through either the original injection or production wells until all the hydrocarbons, viz., those originally in place and those injected therein, are recovered.

Thus, there has been shown and described an improved method of recovering hydrocarbons from a subterranean formation by means of injecting a heated fluid sufficient to cause vaporization of the connate water, thereby providing a displacement mechanism for the hydrocarbons contained therein.

Other modifications and variations of the invention as hereinbefore set forth may be made without departing from the spirit and scope thereof, and therefore only such limitations should be imposed as are indicated in the appended claims.

I claim:

1. A method of recovering hydrocarbons from a subterranean hydrocarbon-bearing formation traversed by a plurality of wells which comprises the steps of:
    (a) introducing via a first well into said hydrocarbon-bearing formation a non-aqueous fluid at a temperature sufficient to cause vaporization of the water contained in said formation,
    (b) displacing hydrocarbons contained in said formation toward a second well adjacent said first well by means of said vaporization of said water,
    (c) recovering said displaced hydrocarbons via said second well,
    (d) terminating the introduction of said non-aqueous fluid into said first well,
    (e) terminating the recovery of said displaced hydrocarbons via said second well and introducing via said second well into said hydrocarbon-bearing formation a non-aqueous fluid at a temperature sufficient to cause vaporization of said water contained in said formation,
    (f) displacing hydrocarbons contained in said formation toward said first well by means of said vaporization of said water, and
    (g) recovering said hydrocarbons displaced by the last-mentioned step via said first well.

2. The method of claim 1 wherein said non-aqueous fluid is a gas selected from the group consisting of carbon monoxide, carbon dioxide, methane, ethane, oxygen, nitrogen, liquefied petroleum gas, and any combinations thereof.

3. The method of claim 1 wherein said non-aqueous fluid is a liquid selected from the group of hydrocarbons having from five to eight carbon atoms, toluene, naphtha, aromatics and any combinations thereof.

4. The method of claim 1 which includes the additional step of injecting a second fluid into said formation via said second well thereby displacing said hydrocarbons and said non-aqueous fluid previously injected into said formation toward said first well, and recovering said hydrocarbons and said non-aqueous fluid via said first well.

5. The method of claim 1 wherein said non-aqueous fluid is miscible with said hydrocarbons contained in said formation.

6. The method of claim 1 wherein said non-aqueous fluid has a vapor pressure below that of said water in said formation.

7. The method of claim 1 wherein said plurality of wells are arranged in a five-spot pattern and said first well and said second well are a part thereof.

(References on following page)

References Cited

UNITED STATES PATENTS

| | | | |
|---|---|---|---|
| 2,584,606 | 2/1952 | Merriam et al. | 166—272 |
| 2,813,583 | 11/1957 | Marx et al. | 166—272 X |
| 3,129,757 | 4/1964 | Sharp | 166—272 X |
| 3,294,167 | 12/1966 | Vogel | 166—272 |
| 3,351,132 | 11/1967 | Dougan et al. | 166—272 X |
| 3,357,487 | 12/1967 | Gilchrist et al. | 166—272 X |
| 3,358,756 | 12/1967 | Vogel | 166—272 X |

DAVID H. BROWN, Primary Examiner

I. A. CALVERT, Assistant Examiner

U.S. Cl. X.R.

166—263, 272